(12) United States Patent
Fujita et al.

(10) Patent No.: US 8,398,799 B2
(45) Date of Patent: Mar. 19, 2013

(54) METHOD OF MANUFACTURING HONEYCOMB STRUCTURE

(75) Inventors: Jun Fujita, Nagoya (JP); Takahisa Kaneko, Nagoya (JP)

(73) Assignee: NGK Insulators, Ltd., Nagoya-shi (JP)

( * ) Notice: Subject to any disclaimer, the term of this patent is extended or adjusted under 35 U.S.C. 154(b) by 1415 days.

(21) Appl. No.: 10/542,013

(22) PCT Filed: Jan. 20, 2004

(86) PCT No.: PCT/JP2004/000422
§ 371 (c)(1),
(2), (4) Date: Mar. 6, 2006

(87) PCT Pub. No.: WO2004/065088
PCT Pub. Date: Aug. 5, 2004

(65) Prior Publication Data
US 2006/0169384 A1     Aug. 3, 2006

(30) Foreign Application Priority Data
Jan. 20, 2003   (JP) ................................. 2003-011615

(51) Int. Cl.
*B32B 37/12* (2006.01)

(52) U.S. Cl. ........ 156/154; 156/153; 156/247; 156/427; 156/701; 156/711; 156/714

(58) Field of Classification Search ............... 156/344, 156/84–86, 247, 153–154, 427, 701, 711, 156/714; 428/116; 427/468, 259, 272
See application file for complete search history.

(56) References Cited

U.S. PATENT DOCUMENTS

| 5,021,204 | A | * | 6/1991 | Frost et al. .................... 264/630 |
| 5,536,355 | A | * | 7/1996 | Rowland ....................... 156/344 |
| 5,629,067 | A | * | 5/1997 | Kotani et al. .................. 428/116 |
| 7,037,567 | B2 | | 5/2006 | Hashimoto et al. |
| 2001/0000165 | A1 | * | 4/2001 | Armstrong ..................... 451/39 |

FOREIGN PATENT DOCUMENTS

| JP | A-04-058546 | 2/1992 |
| JP | A-07-302772 | 11/1995 |
| JP | A-10-027836 | 1/1998 |
| JP | A-2000-007455 | 1/2000 |
| JP | A-2000-279728 | 10/2000 |
| JP | A 2002-126421 | 5/2002 |
| JP | A 2002-126427 | 5/2002 |
| JP | A 2002-224517 | 8/2002 |
| JP | A-2003-010616 | 1/2003 |

OTHER PUBLICATIONS

Derwent Abstract JP-63188039.*
Derwent Abstract JP-60127385.*

* cited by examiner

*Primary Examiner* — Christopher Schatz
(74) *Attorney, Agent, or Firm* — Oliff & Berridge, PLC

(57) ABSTRACT

A method of manufacturing a honeycomb structure having honeycomb segments, which includes a masking step (S1) of attaching masking materials (8) to both end surfaces (2a) of the honeycomb segments (2), a stacked body bonding step (S2) of bonding the honeycomb stacked body (3) by bonding the plurality of honeycomb segments (2) together while interposing adhesive layers therebetween, an adhesive layer drying step (S3) of integrally fixing the honeycomb stacked body (3) by heating and drying the adhesive layers, a masking material separating step (S4), of separating the masking materials (8), and a grinding step (S5) of grinding an outer peripheral portion of the honeycomb stacked body (3) into a predetermined shape.

7 Claims, 8 Drawing Sheets

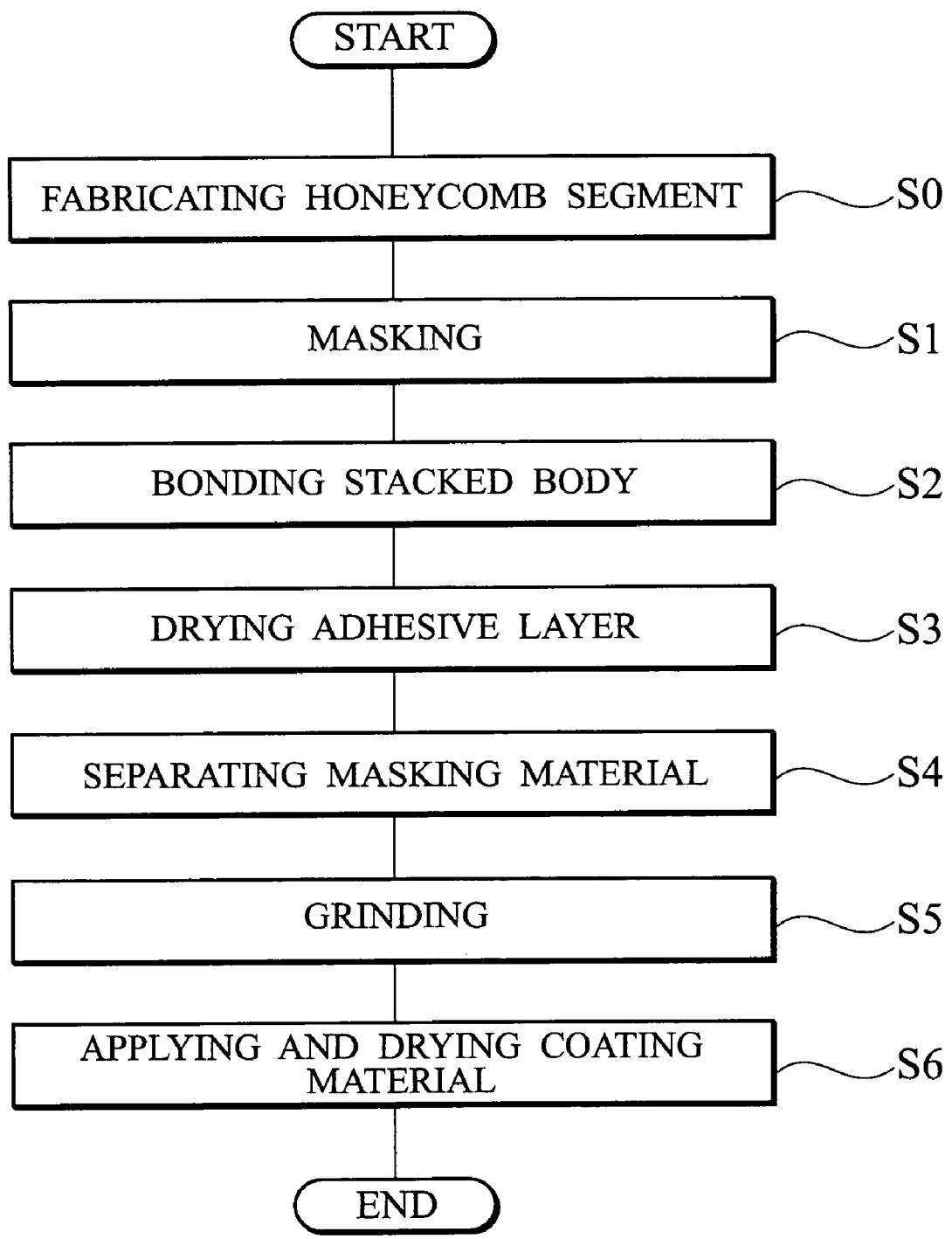

METHOD OF MANUFACTURING HONEYCOMB STRUCTURE

TECHNICAL FIELD

The present invention relates to a method of manufacturing a honeycomb structure used as a filter for removing particulates (granular substances) and the like in exhaust gas discharged from an internal-combustion engine or as a catalyst carrier, and the like.

BACKGROUND ART

A porous honeycomb structure is widely used as a filter for collecting and removing particulates included in dust-containing gas such as exhaust gas from a diesel engine, or as a catalyst carrier for supporting a catalytic component for cleaning up hazardous materials in exhaust gas.

As shown in FIG. 1, in a honeycomb structure 1 of this type, a honeycomb stacked body 3 is formed by bundling a plurality of porous honeycomb segments 2 made of silicon carbide and the like, and a coating material layer 4 is formed around this honeycomb stacked body 3 to construct the entirety. An adhesive layer 9 exists between one honeycomb segment 2 and another honeycomb segment 2.

As shown in FIGS. 2A and 2B, the honeycomb segment 2 includes numerous circulation holes 5 arranged in a longitudinal direction, and partition walls 6 partitioning the circulation holes 5 are configured to function as a filter. As shown in FIG. 2B, either an entrance side (on the left in FIG. 2B) for exhaust gas G or an exit side (on the right in FIG. 2B) is sealed with a filling material 7, whereby the exhaust gas G flowing into one circulation hole 5 passes through the partition wall 6 of the circulation hole 5 and flows out of another circulation hole 5 adjacent thereto.

Incidentally, this honeycomb structure 1 is conventionally manufactured by the method described below (Japanese Unexamined Patent Publication No. 2002-126427).

Firstly, a mixed composition including a solvent, a binder, and the like in addition to ceramic granules as the raw material is prepared, and a ceramic compact is fabricated by performing extrusion molding or the like by use of this mixed composition. Thereafter, the porous honeycomb segment 2 is manufactured by subjecting this ceramic compact to respective processes of drying, degreasing, and firing.

Next, as shown in FIG. 2C, masking materials 8 in which a sticky material layer is formed on a base film are attached to both end surfaces of each honeycomb segment 2.

Thereafter, adhesive paste is coated on side surfaces of the honeycomb segment 2 attaching the masking materials 8, and other honeycomb segments 2 are repeatedly stacked thereon to form the honeycomb stacked body 3.

Next, the entire honeycomb stacked body 3 is heated to dry and harden the adhesive paste. Thereafter, an outer peripheral portion of the honeycomb stacked body 3 is ground into the shape as shown in FIG. 1.

Moreover, the outer peripheral portion of the honeycomb stacked body 3 after grinding is covered with the coating material layer 4, and then the coating material layer 4 is dried. Thereafter, the honeycomb structure 1 is manufactured by separating the masking materials 8.

The separation of the masking materials 8 is performed for instance by pressing a separation sheet (not shown) coated with a sticky material having stronger adhesion than the sticky material in the masking material 8 against the masking material 8, bonding the masking material 8 to the separation sheet, then peeling off the separation sheet, and thereby separating the masking materials 8 from the end surfaces of the honeycomb stacked body 3 (Japanese Unexamined Patent Publication No. 2002-126421).

However, since grinding of the honeycomb stacked body 3 is performed in the state of attaching the masking materials 8, the sticky material in the masking material 8 is bonded to a whetstone used for grinding and causes sudden deterioration of a grinding performance of the whetstone. Accordingly, the whetstone needs to be cleaned or replaced in a short period. As a consequence, there is a problem of causing reduction in operating efficiency.

Accordingly, an object of the present invention is to provide a method of manufacturing a honeycomb structure, which is capable of maximizing a grinding performance of a whetstone for grinding an outer peripheral portion of a honeycomb stacked body into a predetermined shape and thereby enhancing operating efficiency.

DISCLOSURE OF THE INVENTION

A first characteristic of the present invention is a method of manufacturing a honeycomb structure having honeycomb segments of a prism shape provided with numerous circulation holes, which includes a masking step of attaching masking materials to both end surfaces of the honeycomb segments, a stacked body bonding step of bonding the honeycomb stacked body by bonding the plurality of honeycomb segments together while interposing adhesive layers therebetween, an adhesive layer drying step of integrally fixing the honeycomb stacked body by heating and drying the adhesive layers, a masking material separating step of separating the masking materials, a grinding step of grinding an outer peripheral portion of the honeycomb stacked body into a predetermined shape, and a coating material applying and drying step of forming a coating material layer by applying a coating material to the outer peripheral portion of the honeycomb stacked body and then drying the coating material layer.

According to the first characteristic of the present invention, the stacked body bonding step is performed as a post-process to the masking step. Therefore, even if protrusion of the adhesive layer occurs on the end surface of the honeycomb segment in the stacked body bonding step, the protruding adhesive layer remains attached to a surface of the masking material, and can be prevented from reaching the end surface.

Moreover, since the masking material separating step is performed as a post-process to the adhesive layer drying step, it is possible to separate the masking materials easily without causing a collapse of the stacked structure.

Furthermore, since the grinding step is performed as a post-process to the masking material separating step, it is possible to grind the outer peripheral portion of the honeycomb stacked body in the grinding step in the state without the masking materials. In this way, a whetstone used for grinding can fully exert its function without clogging attributable to a sticky material in the masking material.

In addition, the coating material layer to be formed at the outer peripheral portion of the honeycomb stacked body after grinding is formed by applying the coating material. Accordingly, there is no load of external pressure on the coating material layer in the course of application. For this reason, it is possible to minimize inadvertent protrusion of the coating material out to the end surface of the honeycomb stacked body.

A second characteristic of the present invention is that the masking material is an adhesive member for covering at least the outer peripheral portion of the end surface of the honeycomb segment.

According to the second characteristic of the present invention, the masking material is formed of the adhesive member for covering at least the outer peripheral portion of the end surface of the honeycomb segment. Therefore, even when protrusion of the adhesive occurs in any position on the entire outer periphery of the end surface, it is possible to prevent the protrusion of the adhesive from reaching the end surface.

Moreover, when the masking material is formed of the adhesive member in the size to cover only the outer peripheral portion of the end surface, it is possible to perform a separating operation easily in the masking material separating step owing to a small adhesion area to the end surface.

A third characteristic of the present invention is that the adhesive member is a sheet-type adhesive member which includes a base sheet, and a sticky agent to be attached to at least one surface side of this base sheet, and is configured to be bonded to the end surface of the honeycomb segment through the sticky agent.

According to the third characteristic of the present invention, by forming the adhesive member as the masking material by use of the sheet-type adhesive member, it is possible to obtain fine adhesion to the end surface of the honeycomb segment.

Moreover, when the adhesive member includes the base sheet and the sticky agent to be attached to both surface sides of this base sheet, it is possible to perform the separating operation easily in the masking material separating step after using the one surface for adhesion to the end surface of the honeycomb segment, by means of separation using the remaining adhesive surface at the time of separation.

A fourth characteristic of the present invention is that at least any one of the base sheet and the sticky agent of the sheet-type adhesive member is made of a heat degradable material which is degraded by heat in the adhesive layer drying step.

According to the fourth characteristic of the present invention, the sheet-type adhesive member as the masking material is degraded by the heat after undergoing the adhesive layer drying step. Hence it is possible to perform the separating operation easily in the masking material separating step.

A fifth characteristic of the present invention is that the base sheet of the sheet-type adhesive member is made of a heat shrinkable material which shrinks by heat in the adhesive layer drying step.

According to the fifth characteristic of the present invention, the sheet-type adhesive member as the masking material shrinks by the heat after undergoing the adhesive layer drying step, and the sheet-type adhesive member per se starts separation partially. Hence it is possible to perform the separating operation easily in the masking material separating step.

A sixth characteristic of the present invention is that at least any one of the base sheet and the sticky agent of the sheet-type adhesive member is made of a photodegradable material which is degraded by irradiation of ultraviolet rays. Here, the ultraviolet rays are irradiated prior to the masking material separating step.

According to the sixth characteristic of the present invention, the sheet-type adhesive member as the masking material is subjected to photodegradation by irradiating the ultraviolet rays, and thereby reduces an adhesive function. Therefore, by irradiating the ultraviolet rays prior to the masking material separating step, it is possible to perform the separating operation easily in the masking material separating step.

A seventh characteristic of the present invention is that the adhesive layer in the form of a tape including a base and an adhesive layer is bonded to the masking material to detach the base from the end surface in the masking material separating step.

According to the seventh characteristic of the present invention, by detaching the base of the tape from the end surface of the honeycomb stacked body, it is possible to separate the masking material together with the base from the end surface of the honeycomb stacked body.

An eighth characteristic of the present invention is that the end surface of the honeycomb stacked body attaching the masking material is subjected to brushing in the masking material separating step.

According to the eighth characteristic of the present invention, it is possible to separate the masking material from the end surface of the honeycomb stacked body by brushing the end surface of the honeycomb stacked body.

A ninth characteristic of the present invention is that the masking material is suctioned in the masking material separating step.

According to the ninth characteristic of the present invention, it is possible to separate the masking material from the end surface of the honeycomb stacked body by suctioning the masking material.

A tenth characteristic of the present invention is that block-type adhesive members each including a flat surface having approximately the same shape and size as the end surface of the honeycomb segment, and a separation gripper, are bonded to the both end surfaces of the honeycomb segment in the masking step, and the grippers are detached from the end surfaces in the masking material separating step.

According to the tenth characteristic of the present invention, the honeycomb stacked body is bonded by bonding the plurality of honeycomb segments in the state of bonding the block-type adhesive members to the both surfaces together in the stacked body bonding step, and the honeycomb stacked body is dried in the state of bonding the block-type adhesive members to the both surfaces of the respective honeycomb segments in the adhesive layer drying step.

Moreover, in the masking material separating step, the block-type adhesive members can be separated by detaching the grippers from the end surfaces. Accordingly, it is possible to perform the separating operation easily.

Furthermore, the block-type adhesive member after separation can be reused by cleaning the flat surfaces of the blocks where the sticky agent is attached.

BRIEF DESCRIPTION OF THE DRAWINGS

FIG. 3 is a manufacturing flowchart of a honeycomb structure as one embodiment of the present invention.

MOST PREFERABLE EMBODIMENT OF THE INVENTION

Figure 1:
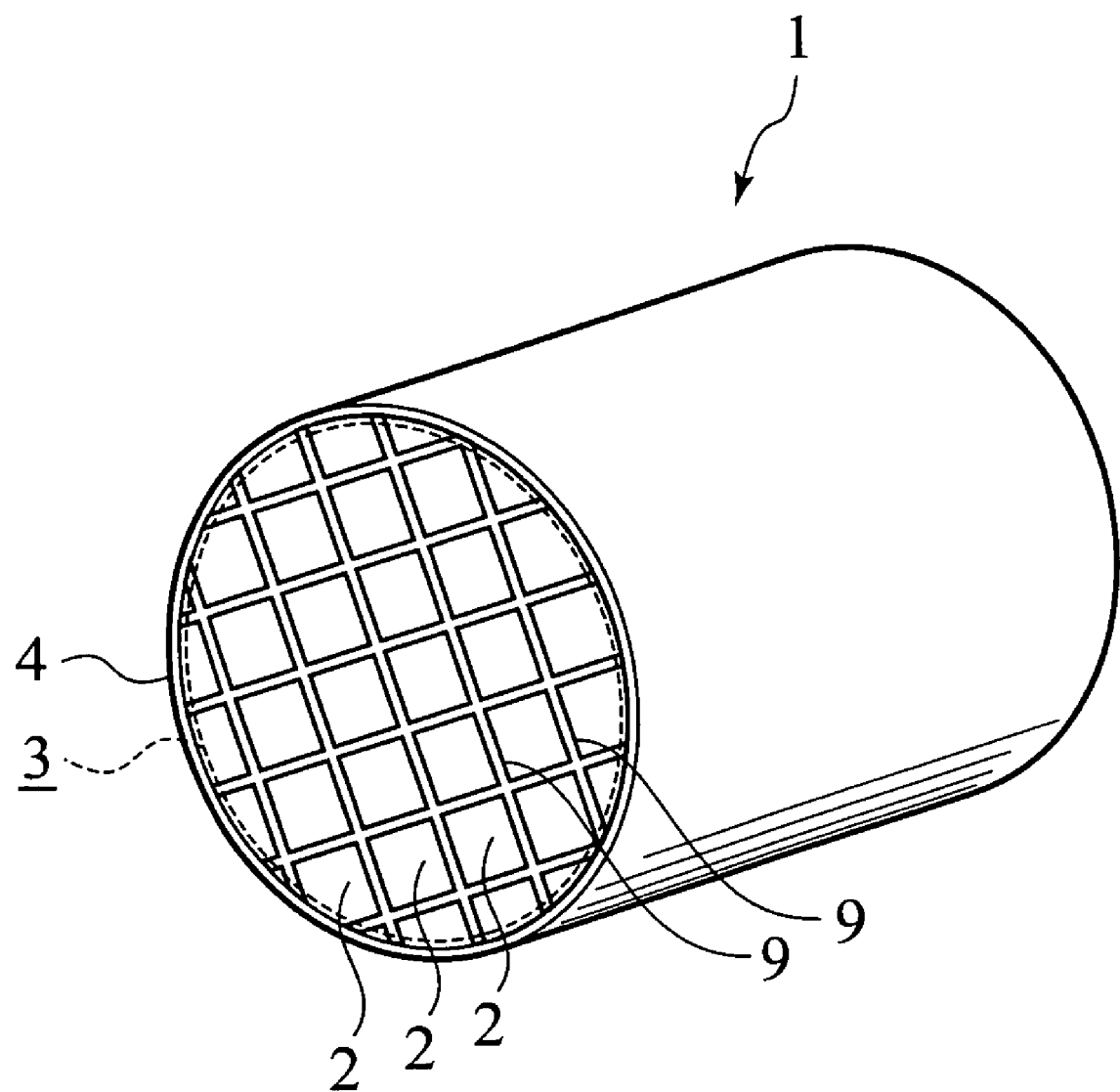
FIG. 1 is a perspective view of a typical honeycomb structure.

Now, an embodiment of the present invention will be described below based on the drawings. Here, the same constituents as those shown in FIG. 1 and FIGS. 2A to 2C are designated by the same reference numerals and explanation thereof will be simplified.

FIG. 3 is a flowchart showing a method of manufacturing a honeycomb structure as one embodiment of the present invention. As similar to the conventional example shown in FIG. 1 and FIGS. 2A to 2C, a honeycomb structure in this case is formed by bonding a plurality of honeycomb segments of a prism shape together, which are provided with numerous circulation holes 5 arranged in a longitudinal direction and are partitioned by porous partition walls 6, while interposing adhesive layers 9 therebetween.

Moreover, the manufacturing method includes a honeycomb segment fabricating method S0 of fabricating the honeycomb segment 2 (FIGS. 2A and 2B) in an ordinary method, a masking step S1 of attaching masking members 8 (which are illustrated with oblique lines in FIG. 2C) on both end surfaces of the honeycomb segment 2, a stacked body bonding step S2 of bonding a honeycomb stacked body 3 by bonding a plurality of honeycomb segments 2 together while interposing the adhesive layers 9 therebetween, an adhesive layer drying step S3 of heating and drying the adhesive layers 9 and thereby integrally fixing the honeycomb stacked body 3, a masking material separating step S4 of separating the masking materials 8, a grinding step S5 of grinding an outer peripheral portion of the honeycomb stacked body 3 into a predetermined shape, and a structure shaping step S6 of forming a coating material layer 4 (FIG. 1) by applying a coating material to the outer peripheral portion of the honeycomb stacked body 3, and then shaping the honeycomb structure 1 by drying the coating material layer 4.

The honeycomb segment fabricating step S0 is not particularly limited, and it is possible to use a general method of manufacturing a material having a honeycomb structure. For example, it is possible to manufacture the honeycomb segment 2 by the following process.

At least one ceramic selected from the group consisting of silicon carbide, silicon nitride, cordierite, alumina, mullite, zirconia, zirconium phosphate, aluminum titanate, titania, and combinations thereof, Fe—Cr—Al group metal, nickel group metal or metal Si and SiC, and the like are used as raw materials, for example. A plastic green body is formed by adding a binder such as methylcellulose or hydroxypropoxyl methylcellulose, a surfactant, water, and the like thereto.

This green body is subjected to extrusion molding, for example, and a honeycomb compact of the shape having the numerous circulation holes 5 partitioned by the partition walls 6 and penetrated in an axial direction is formed.

Figure 2A:
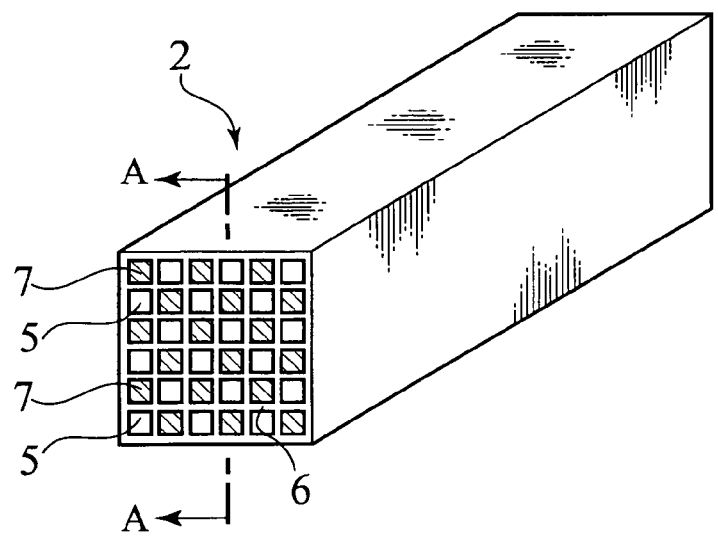
FIG. 2A is a perspective view of a typical honeycomb segment.
Figure 2B:
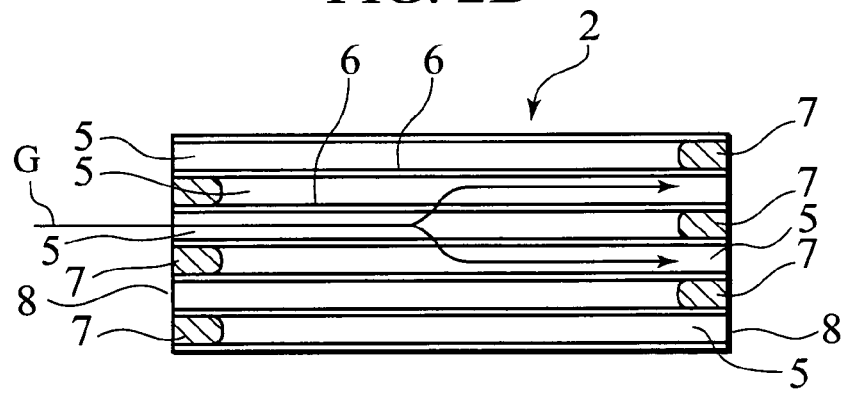
FIG. 2B is a longitudinal cross-sectional view taking along the A-A line in FIG. 2A.
Figure 2C:
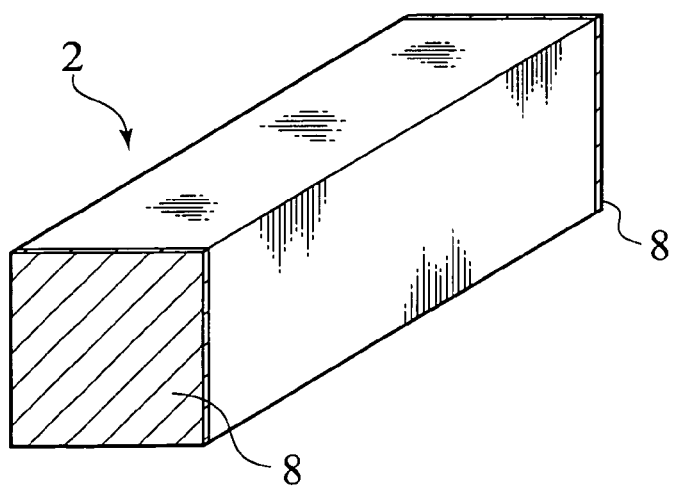
FIG. 2C shows a state of attaching a masking material to the honeycomb segment of FIG. 2A.

The honeycomb segment 2 as shown in FIGS. 2A and 2B can be fabricated by drying this compact by use of microwaves, hot air or the like, and then firing. Sealing by use of filling materials 7 may be performed on this honeycomb segment 2, or alternatively on the honeycomb structure 1 (See FIG. 1) as an end product.

The masking step S1 is carried out before bonding the honeycomb segments 2 together irrespective of existence of the sealing. In the masking step S1, the masking materials 8 are attached to the both end surfaces of the honeycomb segment 2 so as to occlude open portions of the circulation holes 5.

In the stacked body bonding step S2, the plurality of honeycomb segments 2, 2, and so on are adhered and integrated together.

In this step, an adhesive is provided on at least one of adhesive surfaces of two honeycomb segments 2 and 2, and the two adhesive surfaces are bonded together. In this case, it is preferable to perform adhesion by pressing the honeycomb segments 2 and 2 subject to adhesion because it is possible to obtain fine adhesion easily. A pressing force in this case is not particularly limited. However, it is preferable to press at pressure in a range from about 0.3 to 3 kgf/cm$^2$, or more preferable to press at pressure in a range from about 0.5 to 2 kgf/cm$^2$.

It is also preferable to provide two or more adhesives having different compositions in two or more batches in order to form the adhesive layer 9 (see FIG. 1) with a plurality of layers. When forming the adhesive layer into the plurality of layers as described above, an adhesive in which the composition of the adhesive layer contacting the honeycomb segment 2 is close to the composition of the honeycomb segment 2, and the compositions of the adhesive layers gradually change are used, for example.

Meanwhile, depending on the type of the adhesive, it is possible to obtain stronger adhesion by further drying and/or firing.

As for the adhesive in this case, it is preferable to use slurry containing a ceramic. For example, it is preferable to use one made of ceramic powder common to the constituents of the honeycomb segment with addition of inorganic fibers such as ceramic fibers, an organic or inorganic binder, and a dispersant such as water. It is also preferable to include a sol substance such as Si sol.

Moreover, it is preferable to provide a foundation layer and then provide the adhesive thereon. In this way, since side walls of the honeycomb segment are porous, part of the foundation layer is configured to permeate pores. This is preferable as the adhesion between the honeycomb segment and the foundation layer is further strengthened by a so-called anchor effect. The foundation layer is not particularly limited, and it is possible to use a conventional one such as a mixture of SiC, silica sol, ceramic fibers, and water without modification.

The drying step S3 is a step of drying and solidifying the adhesive layer (including the foundation layer) by heating the honeycomb stacked body fabricated in the stacked body bonding step S2 in a drying chamber at a temperature from 50° C. to 150° C. for an appropriate time period. By drying and solidifying the adhesive layer (including the foundation layer), the honeycomb stacked body is integrally fixed.

The masking material separating step S4 is a step of separating the masking materials from the end surfaces of the honeycomb stacked body which is integrally fixed. By this separation, the open portions of the circulation holes not tainted by the protruding adhesive emerge and the protruding adhesive is removed together with the masking materials.

The grinding step S5 is a step of grinding the outer peripheral portion of the honeycomb stacked body so as to form the outer peripheral shape suitable for the use of the honeycomb structure as the end product. For example, the outer peripheral portion of the honeycomb stacked body after separating the masking materials is ground by use of a diamond whetstone.

In the coating material applying and drying step S6, the coating material made of a material similar to the adhesive layers is applied to the outer peripheral portion of the honeycomb stacked body after grinding, and is heated and dried to form the coating material layer by solidification. In this way, it is possible to fabricate the honeycomb structure as the end product.

According to the above-described manufacturing method, the stacked body bonding step S2 is performed as a post-process to the masking step S1. Therefore, even if the adhesive protrudes on the end surface of the honeycomb segment in the stacked body bonding step S2, the protruding adhesive remains attached to a surface of the masking material, and can be prevented from reaching the end surface. In this way, it is also possible to avoid taints, on the circulation holes opening at the end surface, caused by the adhesive, and to ensure normal operation of all the circulation holes.

Moreover, since the masking material separating step is performed as a post-process to the adhesive layer drying step, it is possible to separate the masking materials easily without causing a collapse of the stacked structure. In this way, it is possible to facilitate a separating operation.

Furthermore, since the grinding step is performed as a post-process to the masking material separating step, it is possible to grind the outer peripheral portion of the honeycomb stacked body in the state without the masking materials. In this way, a whetstone used for grinding can fully exert its function without clogging attributable to a sticky material in the masking material. In this way, it is possible to enhance grinding efficiency.

In addition, the coating material layer to be formed at the outer peripheral portion of the honeycomb stacked body after grinding is formed by applying the coating material. Accordingly, there is no load of external pressure on the coating material layer in the course of application. For this reason, it is possible to minimize inadvertent protrusion of the coating material out to the end surface of the honeycomb stacked body. In this way, it is possible to minimize the taints on the circulation holes attributable to the coating material, and thereby to ensure normal operation of all the circulation holes.

Moreover, the masking material is preferably made of an adhesive member for covering at least the outer peripheral portion of the end surface of the honeycomb segment.

Figure 4A:
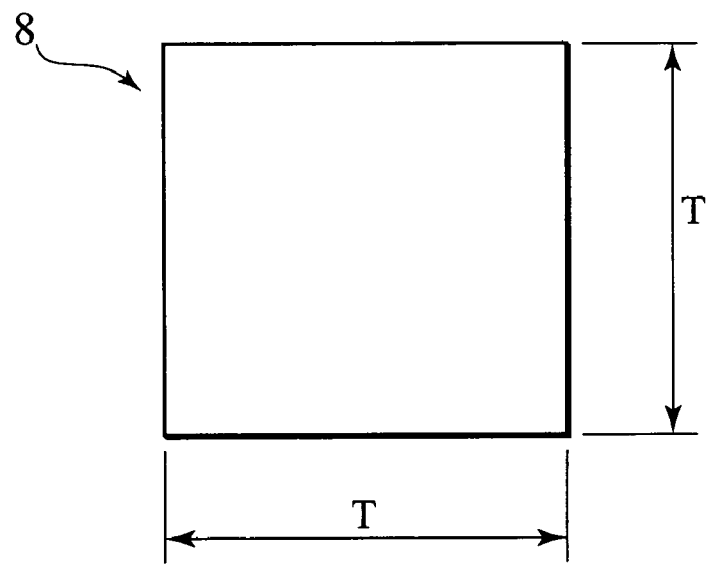
FIGS. 4A and 4B are front views of masking materials (sheet-type adhesive members) applied to a method of manufacturing a honeycomb structure as the one embodiment of the present invention.
Figure 4B:
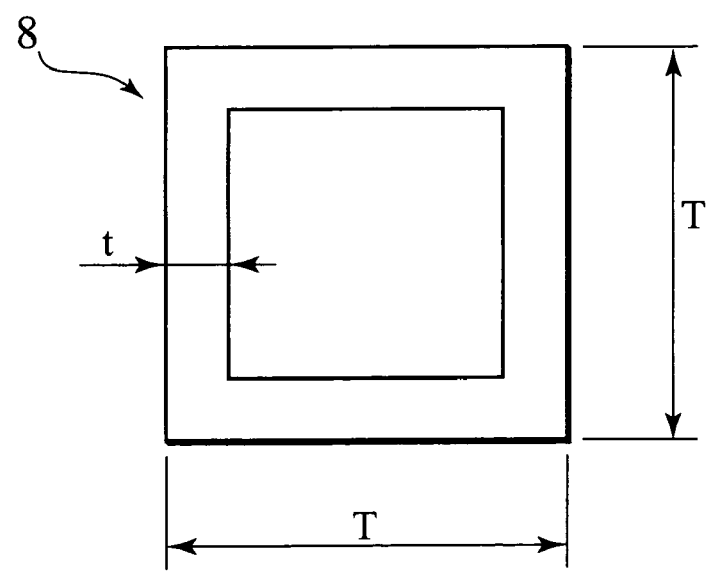

The honeycomb segment is assumed as a quadratic prism having a cross section defined as 35 mm×35 mm and a length equal to 152 mm, for example. The masking material 8 capable of dealing with this honeycomb segment may be formed as a rectangular adhesive member in which a length T of a side is in a range from 35 to 37 mm as shown in FIG. 4A, or formed as a rectangular frame-type adhesive member in which a length T of an outer peripheral side is in a range from 35 to 37 mm and a width t is equal to 5 mm as shown in FIG. 4B.

In this configuration, the masking material is formed of the adhesive member for covering at least the outer peripheral portion of the end surface of the honeycomb segment. Therefore, it is possible to deal with the protrusion of the adhesive in any position on the entire outer periphery of the end surface, and to prevent the protrusion of the adhesive from reaching the end surface.

Moreover, when the masking material is formed of the adhesive member in the size to cover only the outer peripheral portion of the end surface, it is possible to perform the separating operation easily in the masking material separating step S4 owing to a small adhesion area to the end surface.

Meanwhile, it is preferable to form the masking material into a sheet-type adhesive member which includes a base sheet, and a sticky agent to be attached to at least one surface side of this base sheet, and is configured to be bonded to the end surface of the honeycomb segment through the sticky agent. A masking tape (made by Sumitomo 3M Limited, product number 4733) can be used as this sheet-type adhesive member, for example.

By forming the adhesive member as the masking material by use of the sheet-type adhesive member, it is possible to obtain fine adhesion to the end surface of the honeycomb segment.

Moreover, when the adhesive member includes the base sheet and the sticky agent to be attached to both surface sides of this base sheet, it is possible to perform the separating operation easily in the masking material separating step after using the one surface for adhesion to the end surface of the honeycomb segment, by means of separation using the remaining adhesive surface at the time of separation.

It is preferable to form at least any one of the base sheet and the sticky agent of the sheet-type adhesive member by use of a heat degradable material which is degraded by heat in the drying step. A heat degradable tape (made by Nitto Denko Corporation, REVALPHA No. 3193MS) including a sticky agent to be degraded by heat can be used as this sheet-type adhesive member, for example.

The above-described sheet-type adhesive member is degraded by the heat after undergoing the adhesive layer drying step S3. Accordingly, it is possible to perform the separating operation easily in the masking material separating step S4.

It is also possible to form the base sheet of the sheet-type adhesive member by use of a heat shrinkable material which shrinks by the heat in the drying step. Upon shrinkage, the heat shrinkable material shrinks by 70% longitudinally and by 10% laterally, for example. A heat shrinkable tape (made by Sumitomo 3M Limited) configured to reduce adhesion from 4 N/cm to 0.1 N/cm at 80° C.×30 min., can be used as this sheet-type adhesive member, for example.

The above-described sheet-type adhesive member shrinks by the heat after undergoing the adhesive layer drying step S3, and the sheet-type adhesive member per se starts separation partially. Accordingly, it is possible to perform the separating operation easily in the masking material separating step-S4.

It is also possible to form at least any one of the base sheet and the sticky agent of the sheet-type adhesive member by use of a photodegradable material which is degraded by irradiation of ultraviolet rays. An ultraviolet-ray tape (made by Furukawa Electric Co., Ltd., product number SP-575B-150) can be used as this sheet-type adhesive member, for example.

The above-described sheet-type adhesive member is subjected to photodegradation by irradiating the ultraviolet rays, and thereby reduces an adhesive function. Accordingly, by irradiating the ultraviolet rays prior to the masking material separating step S4, it is possible to perform the separating operation easily in the masking material separating step S4.

Next, masking material separating means in the masking material separating step will be described.

Figure 5:
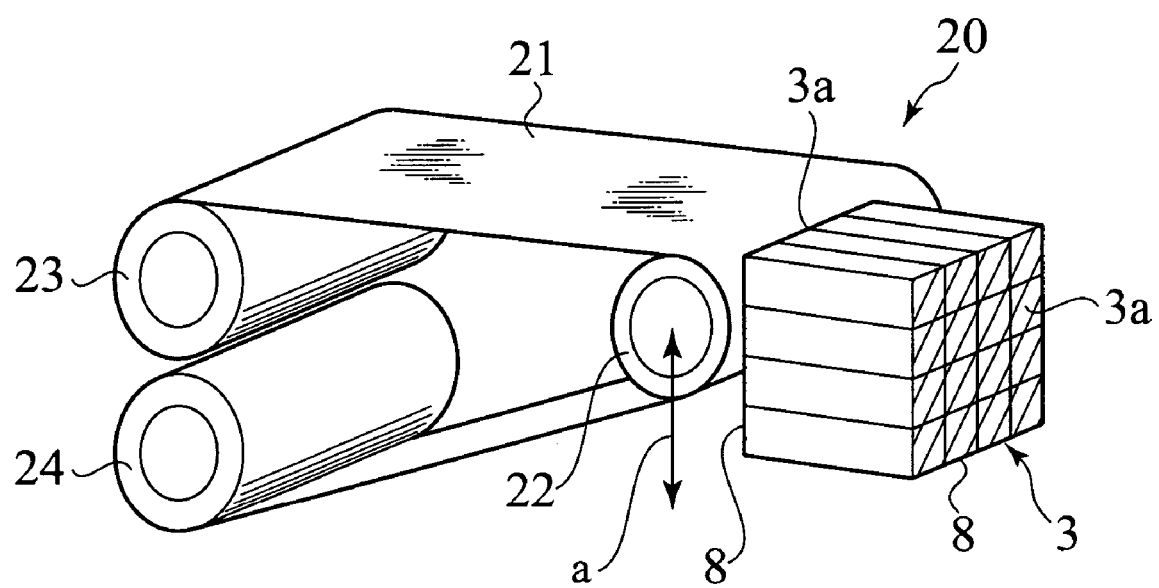
FIG. 5 is a schematic explanatory view of masking material separating means applied to the method of manufacturing a honeycomb structure as the one embodiment of the present invention.

FIG. 5 shows taping means 20 as an example of the masking material separating means.

The taping means 20 includes a sticky tape 21 having approximately the same width as the honeycomb stacked body 3, and a separation roller 22 configured to move a sticky surface of the sticky tape 21 in parallel along an end surface 3a (as indicated by an arrow a in FIG. 5) while pressing the sticky surface against the masking material 8 attached to the end surface 3a of the honeycomb stacked body 3 and to detach the sticky surface from the end surface 3a. In FIG. 5, description is made only in terms of one of the end surfaces 3a of the honeycomb stacked body 3 and description in terms of the other end surface 3a is omitted. However, the separating operation for the masking material 8 (which is illustrated with oblique lines in FIG. 5) is similarly performed on the other end surface 3a. Here, in FIG. 5, a supply roller 23 supplies the sticky tape 21, and a take-up roller 24 takes up the sticky tape 21 attaching the masking material 8.

By pressing the sticky tape 21 against the masking material 8 attached to the end surface 3a of the honeycomb stacked body 3, it is possible to attach the sticky tape 21 to the masking material 8. Then, by detaching the sticky tape 21 from the end surface 3a of the honeycomb stacked body 3, it is possible to separate the masking material 8 from the end surface 3a of the honeycomb stacked body 3. Accordingly, it is possible to send the honeycomb stacked body 3 without the masking materials 8 to the grinding step S5. Here, upon separation of the masking materials 8, the honeycomb stacked body 3 is grasped by appropriate fixing means (not shown).

Figure 6:
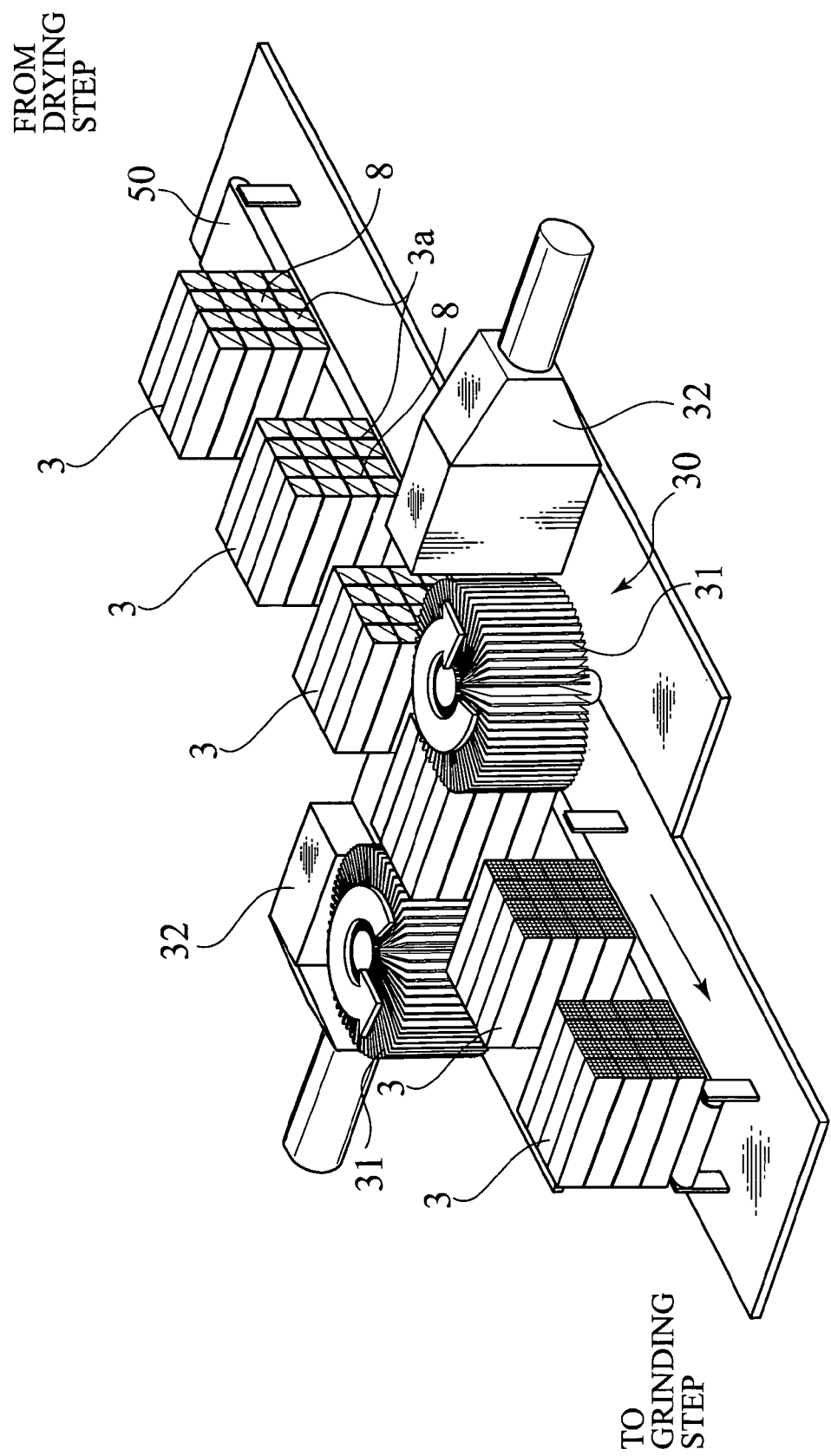
FIG. 6 is a schematic explanatory view of another masking material separating means applied to the method of manufacturing a honeycomb structure as the one embodiment of the present invention.

FIG. 6 shows brushing means 30 as another example of the masking material separating means.

The brushing means 30 includes rotary brushes 31 and 31 disposed at both side portions of a delivery conveyor 50 installed between a site for performing the adhesive layer drying step S3 and a site for performing the grinding step S5, and dust collectors 32 and 32 located closely to the respective rotary brushes 31 and configured to suction the masking materials 8 attached to the rotary brushes 31 and thereby to clean up the rotary brushes 31.

The rotary brush 31 includes a rotating shaft and a brush, which is disposed radially around the rotating shaft and configured to contact the masking material 8 on the end surface 3a of the honeycomb stacked body 3 while rotating. Plastics, animal hair, fabrics, and the like can be used as the material of the brush.

According to this brushing means 30, the both end surfaces 3a and 3a of the honeycomb stacked body 3 placed on the delivery conveyor 50 are brushed by the rotary brushes 31 and 31 in the delivery process, and the masking materials 8 attached to the respective end surfaces 3a are separated by this brushing. The separated masking materials 8 may scatter in the air or may be attached to the rotary brushes 31. In any case, these are collected by the dust collectors 32.

It is also possible to send the honeycomb stacked body 3 without the masking materials 8 to the grinding step S5 by use of the above-described brushing means 30.

Preferably, the brushing means 30 includes a collecting member (not shown) provided with a comb-shape portion inserting and extracting at a brush portion of the rotary brush 31, which is disposed on a downstream side of the dust collector 32 along a direction of rotation of the rotary brush 31. That is, the brush of the rotary brush 31 approaches the collecting member soon after passing by the dust collector 32.

Figure 7:
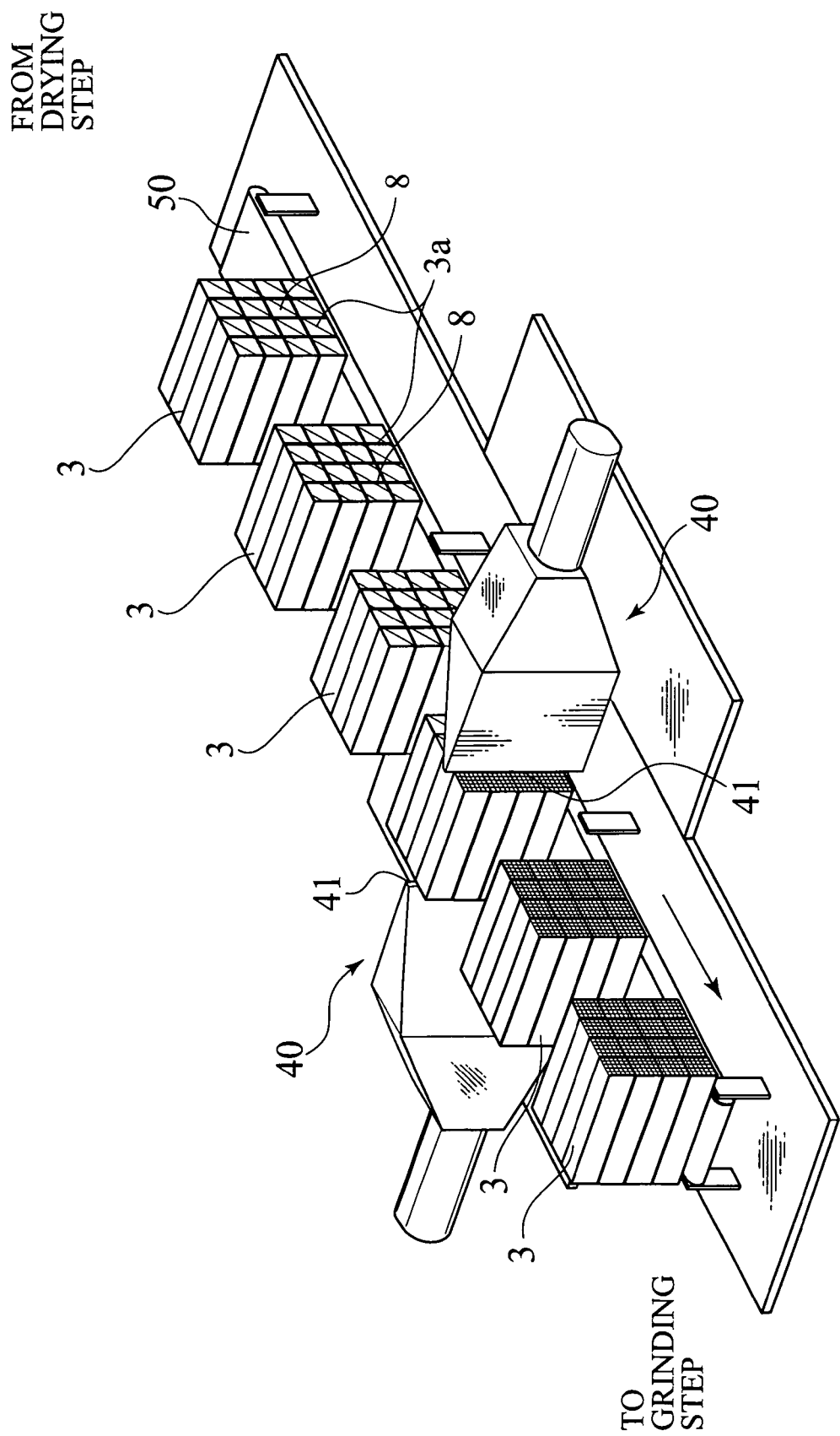
FIG. 7 is a schematic explanatory view of still another masking material separating means applied to the method of manufacturing a honeycomb structure as the one embodiment of the present invention.

In this configuration, even if there are the masking materials 8 which are attached to the rotary brushes 31 but not collected by the dust collectors 32, it is possible to rake out the masking materials 8 by inserting the comb-shape portion of the collecting member into the brush portion of the rotary brush, and thereby to contribute to recovery of the performance of the rotary brushes 31. The masking materials 8 thus raked out are collected to the dust collectors 32 located on the upstream side. That is, the masking materials 8 thus raked out are drawn into the dust collector 32 which passes immediately ahead. FIG. 7 shows suctioning means 40 as another example of the masking material separating means.

The suctioning means 40 includes a suction hole 41 located in the vicinity of the end surface 3a of the honeycomb stacked body 3 placed on the delivery conveyor 50.

According to this suctioning means 40, when the respective end surfaces 3a of the honeycomb stacked body 3 placed on the delivery conveyor 50 approach the suction holes 41 in the delivery process, the masking material 8 attached to the respective end surfaces 3a are separated by suction and are drawn into the suctioning means 40.

In this configuration, since the suctioning means 40 can separate the masking materials 8 from the end surface 3a of the honeycomb stacked body 3 by suctioning the end surface 3a of the honeycomb stacked body 3, it is possible to send the honeycomb stacked body 3 without the masking materials 8 to the grinding step S5.

Moreover, the suctioning means 40 preferably includes a function to reverse suction, that is, to blow out the air from the suction hole 41. Alternatively, a tip portion of the suction hole 41 is formed into a detachable cartridge.

In this configuration, when clogging of the masking materials 8 occurs at the tip portion of the suction hole 41, it is possible to recover the function of the suctioning means 40 by reversing the suction to blow the masking materials 8 away or by replacing the tip portion including the suction hole 41.

Meanwhile, the present invention is not limited to the above-described embodiment, and may include the following modified example.

Specifically, the adhesive member constituting the masking material may be formed as a block-type adhesive member.

Figure 8:
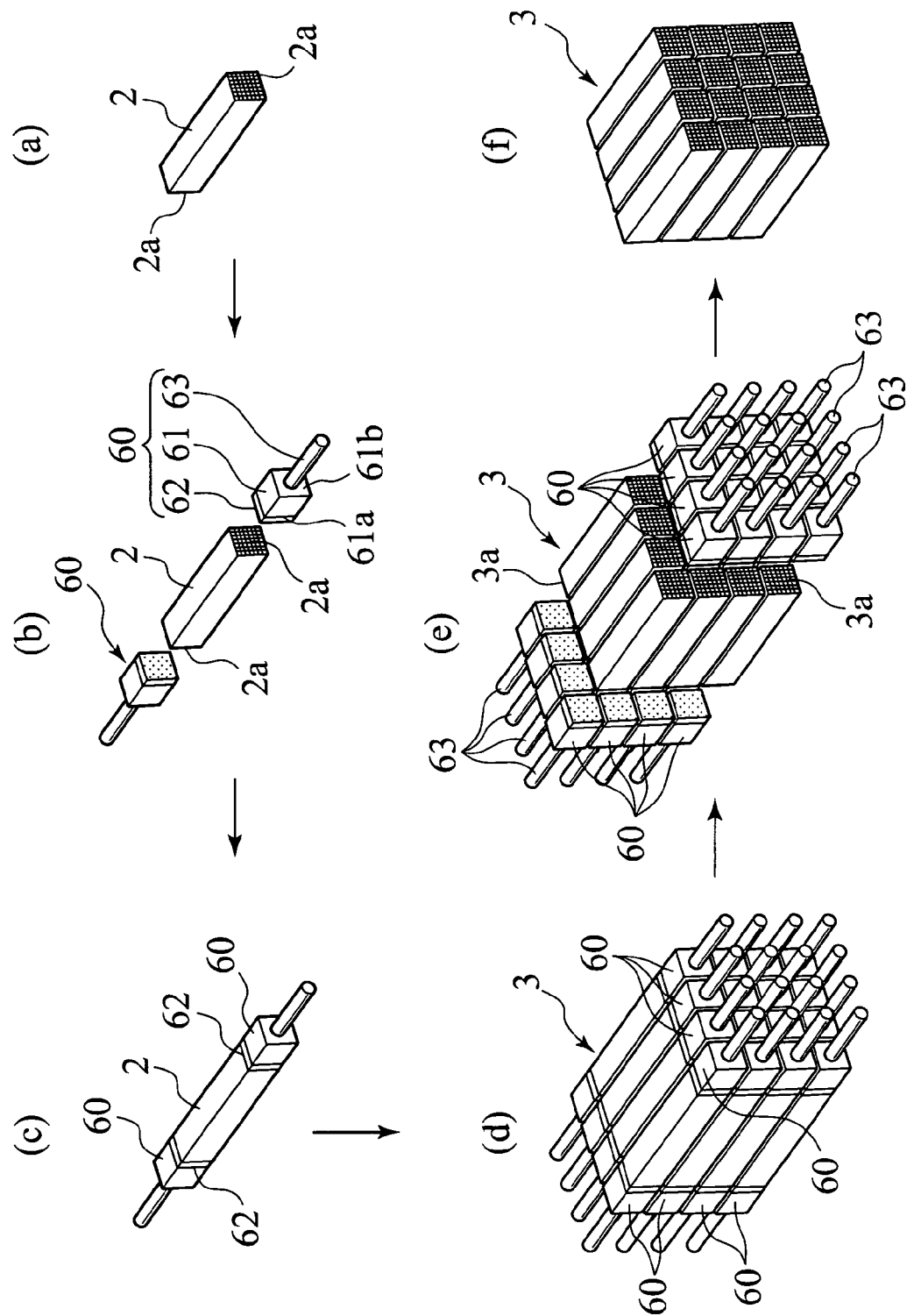
FIGS. 8(a) to 8(f) are explanatory views of a method of manufacturing the honeycomb structure as a modified example of the present invention, in which suffixes (a), (b), (c), (d), (e), and (f) represent a sequence of steps.

In this embodiment, as shown in FIG. 8B, a block-type adhesive member 60 includes a block body 61 having a flat surface 61a with approximately the same shape and size as the end surface 2a of the honeycomb segment 2, a sticky agent 62 to be attached to the flat surface 61a, and separating means 63 to be provided on a side surface 61b opposite to the flat surface 61a of the block body 61. The block body 61 is formed as a solid cubic hexahedron, and the separating means 63 is formed as a rod-shaped body implanted on the side surface 61b. The block body 61 may be formed by use of a material similar to the honeycomb segment 2, for example.

Moreover, this block-type adhesive member 60 is bonded to the end surface 2a of the honeycomb segment 2 through the sticky agent 62 in the masking step S1 (See FIG. 3), and is separated from the end surface 3a of the honeycomb stacked body 3 by use of the separating means 63 in the masking material separating step S4 (see FIG. 3).

A manufacturing process using this block-type adhesive member 60 is shown in FIGS. 8(a) to 8(f). FIG. 8(a) shows the honeycomb segment 2 fabricated in the honeycomb segment fabricating step S0 (see FIG. 3). FIGS. 8(b) and 8(c) show an aspect of boding the block-type adhesive members 60 to the both end surfaces 2a and 2a of each honeycomb segment 2 through the sticky agent 62 in the masking step S1 (see FIG. 3). FIG. 8(d) shows the honeycomb stacked body 3 fabricated by performing the stacked body bonding step S2 and the adhesive layer drying step S3 (see FIG. 3).

FIG. 8(e) shows a state of separating the block-type adhesive members 60, 60, and so on from the end surfaces 3a of the honeycomb stacked body 3 in the masking material separating step S4 (see FIG. 3). The separating operation at this time can be easily carried out manually by grasping the separating means 63, and the like. However, it is also possible to use an appropriate separation jig which can chuck a plurality of pieces of the separating means 63 at the same time. Meanwhile, the sticky agent 62 may be made of the heat degradable material which is degraded by the heat in the adhesive layer drying step S3 or the photodegradable material which is degraded by irradiation of ultraviolet rays. In this case, it is possible to perform the separating operation even more easily by undergoing the drying step S3 or irradiating ultraviolet rays. FIG. 8(f) shows the honeycomb stacked body 3 after undergoing the masking material separating step S4 but before the grinding step S5 (see FIG. 1). Thereafter, the honeycomb stacked body 3 is sequentially subjected to the grinding step S5 and the structure shaping step S6 as similar to the above-described manufacturing method, and is formed into the honeycomb structure 1.

As described above, in the manufacturing method using the block-type adhesive members 60, the honeycomb stacked body 3 is bonded by bonding the plurality of honeycomb segments 2 in the state of bonding the block-type adhesive members 60 to the both end surfaces 2a and 2a together in the stacked body bonding step S2. Moreover, the honeycomb stacked body 3 is dried in the state of bonding the block-type adhesive members 60 to the both end surfaces 2a and 2a of the respective honeycomb segments 2 in the adhesive layer drying step S3.

Moreover, the block-type adhesive members 60 after separation can be reused by cleaning the flat surfaces 61a where the sticky agent 62 is attached. Here, in addition to simply cleaning the flat surfaces 61a by use of a surfactant, it is also possible to grind the flat surfaces 61a by use of an appropriate whetstone.

Here, it is also possible to separate the sheet-type adhesive members (the masking materials 8) and the block-type adhesive members 60 before drying.

Industrial Applicability

As described above, according to the first characteristic of the present invention, the grinding step is performed as the post-process to the masking material separating step. Therefore, it is possible to grind the outer peripheral portion of the honeycomb stacked body in the grinding step in the state without the masking materials. In this way, the whetstone used for grinding can fully exert its function without clogging attributable to the sticky material in the masking material. Hence it is possible to enhance the operating efficiency.

Meanwhile, according to the second characteristic of the present invention, the masking material is formed of the adhesive member for covering at least the outer peripheral portion of the end surface of the honeycomb segment. Therefore, it is possible to deal with the protrusion of the adhesive in any position on the entire outer periphery of the end surface, and to prevent the protrusion of the adhesive from reaching the end surface. Moreover, when the masking material is formed of the adhesive member in the size to cover only the outer peripheral portion of the end surface, it is possible to perform the separating operation easily in the masking material separating step owing to the small adhesion area to the end surface.

Meanwhile, according to the third characteristic of the present invention, by forming the adhesive member as the masking material by use of the sheet-type adhesive member, it is possible to obtain fine adhesion to the end surface of the honeycomb segment. Hence it is possible to obtain a favorable masking effect.

Meanwhile, according to the fourth characteristic of the present invention, the sheet-type adhesive member as the masking material is degraded by the heat after undergoing the adhesive layer drying step. Therefore, it is possible to perform the separating operation easily in the masking material separating step. In this way, it is possible to further enhance the operating efficiency.

Meanwhile, according to the fifth characteristic of the present invention, the sheet-type adhesive member as the masking material shrinks by the heat after undergoing the adhesive layer drying step, and the sheet-type adhesive member per se starts separation partially. Therefore, it is possible to perform the separating operation easily in the masking material separating step. In this way, it is possible to further enhance the operating efficiency.

Meanwhile, according to the sixth characteristic of the present invention, the sheet-type adhesive member as the masking material is subjected to photodegradation by irradiating the ultraviolet rays, and thereby reduces the adhesive function. Therefore, by irradiating the ultraviolet rays prior to the masking material separating step, it is possible to perform the separating operation easily in the masking material separating step. In this way, it is possible to further enhance the operating efficiency.

Meanwhile, according to the seventh characteristic of the present invention, it is possible to bond the masking materials to the taping means and then to separate the masking materials from the end surfaces of the honeycomb stacked body. Therefore, the honeycomb stacked body without the masking materials can be sent to the grinding step. In this way, it is possible to enhance efficiency of the grinding operation.

Meanwhile, according to the eighth characteristic of the present invention, it is possible to separate the masking materials from the end surfaces of the honeycomb stacked body by brushing the masking materials on the end surfaces of the honeycomb stacked body by use of the brushing means. Therefore, the honeycomb stacked body without the masking materials can be sent to the grinding step. In this way, it is possible to enhance efficiency of the grinding operation.

Meanwhile, according to the ninth characteristic of the present invention, it is possible to separate the masking materials from the end surfaces of the honeycomb stacked body by suctioning the end surfaces of the honeycomb stacked body by use of the suctioning means. Therefore, the honeycomb stacked body without the masking materials can be sent to the grinding step. In this way, it is possible to enhance efficiency of the grinding operation.

Meanwhile, according to the tenth characteristic of the present invention, the block-type adhesive member including the separating means and the block body is used as the adhesive member. Therefore, in addition to facilitation of the separating operation using the separating means, it is also possible to clean up and reuse the block body. In this way, it is possible to reduce waste and to achieve cost reduction as well.

The invention claimed is:
1. A method of manufacturing a honeycomb structure having honeycomb segments of a prism shape provided with numerous circulation holes, the method comprising:
   a masking step of attaching masking materials to both end surfaces of the honeycomb segments;
   a stacked body bonding step of bonding the honeycomb stacked body by bonding the plurality of honeycomb segments together while interposing adhesive layers therebetween;
   an adhesive layer drying step of integrally fixing the honeycomb stacked body by heating and drying the adhesive layers;

a masking material separating step of separating the masking materials;

a grinding step of grinding an outer peripheral portion of the honeycomb stacked body into a predetermined shape after the masking material separating step; and a coating material applying and drying step of forming a coating material layer by applying a coating material to the outer peripheral portion of the honeycomb stacked body without exerting an external pressure on the coating material layer in the course of application and then drying the coating material layer, the coating material applying step being performed after the masking material separating step, wherein at least the outer peripheral portion of the end surface of the honeycomb segment is covered with the masking material, the masking material comprises an adhesive member that comprises a base sheet and a sticky agent to be attached to at least one surface side of this base sheet, the adhesive member is bonded to the end surface of the honeycomb segment through the sticky agent, and the base sheet is made of a heat shrinkable material which shrinks by heat in the adhesive layer drying step.

2. The method of manufacturing a honeycomb structure according to claim 1,
wherein an adhesive layer of a tape is bonded to the masking material and a base of the tape is detached from the end surface with the masking material in the masking material separating step.

3. The method of manufacturing a honeycomb structure according to claim 1,
wherein the end surface attaching the masking material is subjected to brushing in the masking material separating step.

4. The method of manufacturing a honeycomb structure according to claim 1,
wherein the masking material is suctioned from a position close to the end surface attaching the masking material in the masking material separating step.

5. The method of manufacturing a honeycomb structure according to claim 1, wherein the stacked body bonding step is performed after the masking step.

6. The method of manufacturing a honeycomb structure according to claim 1, wherein the masking material separating step is performed after the adhesive layer drying step.

7. The method of manufacturing a honeycomb structure according to claim 1, wherein the coating material layer is applied at the outer peripheral portion of the honeycomb stacked body after the grinding step.

* * * * *